(12) United States Patent
Tripathi et al.

(10) Patent No.: US 9,124,934 B2
(45) Date of Patent: Sep. 1, 2015

(54) RULE-BASED CLASSIFICATION OF ELECTRONIC DEVICES

(75) Inventors: Ajay Tripathi, San Ramon, CA (US); Desiree D. G. Gosby, San Francisco, CA (US); Eugene Krivopaltsev, San Jose, CA (US)

(73) Assignee: INTUIT INC., Mountain View, CA (US)

( * ) Notice: Subject to any disclaimer, the term of this patent is extended or adjusted under 35 U.S.C. 154(b) by 88 days.

(21) Appl. No.: 13/347,604

(22) Filed: Jan. 10, 2012

(65) Prior Publication Data

US 2013/0179561 A1 Jul. 11, 2013

(51) Int. Cl.
G06F 15/173 (2006.01)
H04N 21/45 (2011.01)
H04N 21/258 (2011.01)
H04N 21/2662 (2011.01)
H04N 21/426 (2011.01)

(52) U.S. Cl.
CPC ..... *H04N 21/4532* (2013.01); *H04N 21/25825* (2013.01); *H04N 21/25833* (2013.01); *H04N 21/25858* (2013.01); *H04N 21/2662* (2013.01); *H04N 21/42684* (2013.01)

(58) Field of Classification Search
CPC ....... G06F 15/16; G06F 15/173; G06F 17/30; G06F 17/30905; G06Q 10/063; G21C 17/00; H04N 21/4532; H04N 21/42684; H04N 21/2662; H04N 21/25825; H04N 21/25858; H04N 21/25833; H04L 67/303; H04L 67/2842; H04L 67/2814
USPC .......................................... 709/224; 370/252
See application file for complete search history.

(56) References Cited

U.S. PATENT DOCUMENTS

| | | | |
|---|---|---|---|
| 8,150,938 B1* | 4/2012 | Walsh et al. ................... | 709/217 |
| 2004/0044622 A1* | 3/2004 | Blott et al. ....................... | 705/40 |
| 2004/0203851 A1 | 10/2004 | Vetro | |
| 2005/0096870 A1* | 5/2005 | Butler ............................ | 702/183 |
| 2006/0101182 A1* | 5/2006 | Drabczuk ...................... | 710/300 |
| 2007/0237093 A1* | 10/2007 | Rajagopalan et al. ........ | 370/254 |
| 2008/0126286 A1* | 5/2008 | Machani .......................... | 706/47 |
| 2008/0162973 A1* | 7/2008 | Landry et al. ................. | 713/340 |
| 2008/0313210 A1 | 12/2008 | Cooperstein | |
| 2009/0248787 A1* | 10/2009 | Sivasubramanian et al. . | 709/201 |
| 2010/0188971 A1* | 7/2010 | Chiang .......................... | 370/225 |

* cited by examiner

*Primary Examiner* — Anthony Mejia
*Assistant Examiner* — Mehulkumar Shah
(74) *Attorney, Agent, or Firm* — Park, Vaughan, Fleming & Dowler LLP; Chia-Hsin Suen

(57) ABSTRACT

The disclosed embodiments provide a system that facilitates interaction between an electronic device and a content provider. During operation, the system obtains a device profile containing a set of properties for the electronic device and a set of classification rules associated with the content provider. Next, the system identifies a device class of the electronic device based on the device profile and the classification rules. Finally, the system provides the device class to the content provider, wherein the content provider selects content to transmit to the electronic device based on the device class.

17 Claims, 6 Drawing Sheets

RULE-BASED CLASSIFICATION OF ELECTRONIC DEVICES

BACKGROUND

Related Art

The present embodiments relate to techniques for classifying electronic devices. More specifically, the present embodiments relate to techniques for performing rule-based classification of electronic devices.

Content adaptation refers to the transformation of content to adapt to capabilities of different electronic devices, such as mobile phones, tablet computers, e-book readers, personal digital assistants, and/or portable media players. For example, a web server may receive a request for a webpage from a mobile phone. The web server may obtain an identifier for the mobile phone from the request and use the identifier to identify a device class for the mobile phone and/or retrieve a set of capabilities for the mobile phone. The web server may then transform the webpage to adapt to the mobile phone's device class and/or capabilities.

However, existing content adaptation techniques are associated with a number of limitations. First, content adaptation code is tightly coupled to existing device capabilities and/or classes. As a result, additions and/or modifications to the device capabilities and/or classes may require extensive changes to the content adaptation code. For example, content adaptation code on a web server may be rewritten to identify a new device class for a tablet computer and adapt the web server's content to the new device class. In addition, increases in the number of device capabilities and/or classes over time may result in a corresponding increase in the development time and/or complexity of the content adaptation code.

Second, the identification and/or classification of devices for content adaptation may be limited to device capabilities and/or types that are relevant to the content being transformed. Thus, a device identification and/or classification mechanism tailored for the adaptation of one type of content may not be suitable for use with the adaptation of other types of content. For example, a device classification mechanism configured to identify device capabilities and/or classes for the adaptation of webpages to different electronic devices may be incapable of identifying device capabilities and/or classes for the delivery of application installation packages to the electronic devices.

Hence, content adaptation may be facilitated by increasing the configurability and/or flexibility of mechanisms used to identify and/or classify electronic devices before content is adapted to the electronic devices.

SUMMARY

The disclosed embodiments provide a system that facilitates interaction between an electronic device and a content provider. During operation, the system obtains a device profile containing a set of properties for the electronic device and a set of classification rules associated with the content provider. Next, the system identifies a device class of the electronic device based on the device profile and the classification rules. Finally, the system provides the device class to the content provider, wherein the content provider selects content to transmit to the electronic device based on the device class.

In some embodiments, obtaining the device profile involves obtaining an identifier for the electronic device, and using the identifier to obtain the device profile from a device description repository.

In some embodiments, the identifier is obtained from at least one of a request for the content by the electronic device and the content provider.

In some embodiments, each classification rule from the set of classification rules includes a set of conditions, one or more operators, and an outcome.

In some embodiments, identifying the device class of the electronic device based on the device profile and the classification rules involves evaluating the conditions based on the properties, and using the evaluated conditions and the operators to determine if the classification rule is met. If the classification rule is met, the system obtains the device class from the outcome.

In some embodiments, if none of the classification rules are met, the system identifies the device class as a default device class.

In some embodiments, the set of properties includes at least one of an input device, a display dimension, a display resolution, an operating system, a hardware capability, and a software capability.

In some embodiments, the content is at least one of web content, application content, and data.

In some embodiments, the set of classification rules is generated by at least one of the content provider and a clustering technique.

BRIEF DESCRIPTION OF THE FIGURES

In the figures, like reference numerals refer to the same figure elements.

DETAILED DESCRIPTION

Figure 1:
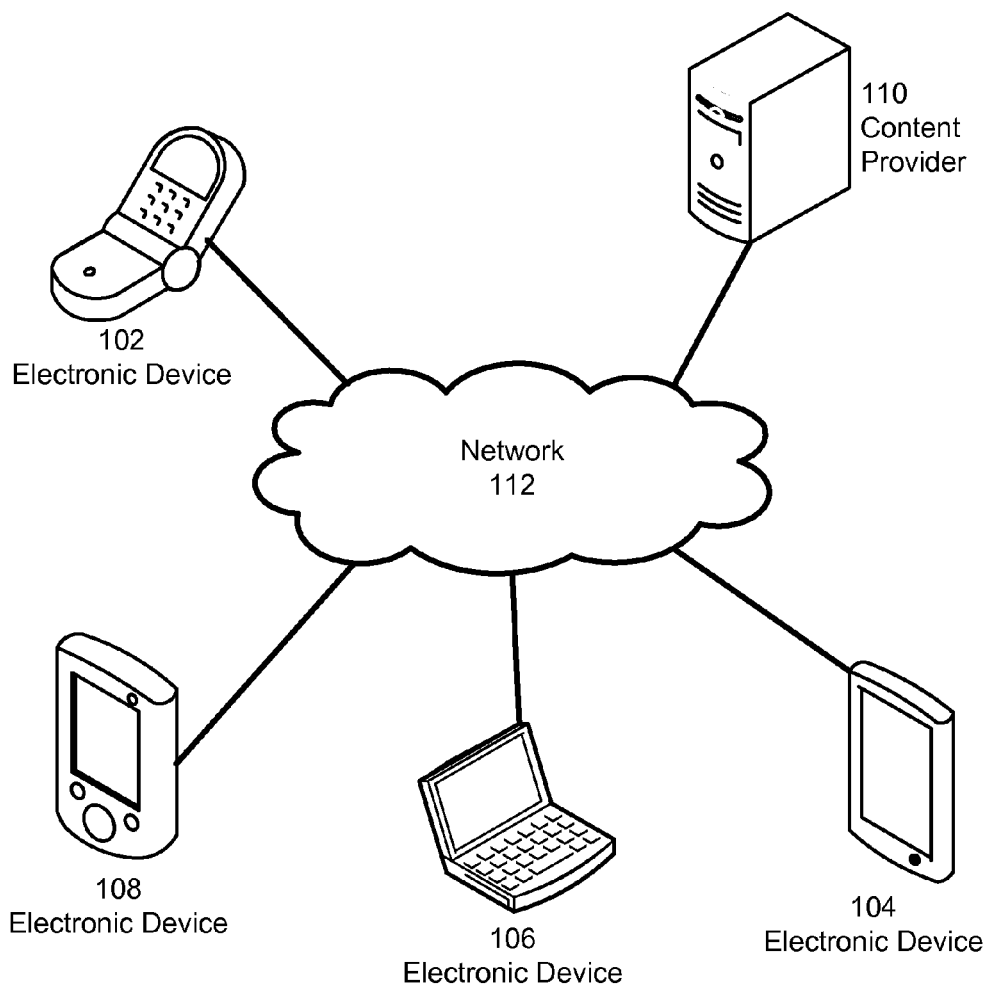
FIG. 1 shows the distribution of content from a content provider to a set of electronic devices in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating interaction between an electronic device and a content provider. The electronic device may request content from the content provider, and the content provider may transmit the content to the electronic device in response to the request. For example, the electronic device may send a HyperText Transfer Protocol (HTTP) request for a webpage to a web server. The web server may process the request by generating and/or retrieving the webpage and transmitting the webpage to the electronic device.

More specifically, the disclosed embodiments provide a method and system for facilitating the adaptation of content to the electronic device by dynamically classifying the electronic device based on a device profile for the electronic device and a set of classification rules associated with the content provider. The device profile may include a set of properties for the electronic device. For example, the device profile may include an input device, a display dimension, a display resolution, an operating system, a hardware capability, and/or a software capability of the electronic device. In addition, the device profile may be obtained by obtaining an identifier for the electronic device from the electronic device's request for content and using the identifier to obtain the device profile from a device description repository containing device profiles for various electronic devices.

The classification rules may be generated by the content provider and/or a clustering technique and stored in a rules repository that is separate from the content provider. Each classification rule may include a set of conditions, one or more operators, and an outcome. To classify the electronic device, the conditions of the classification rule may be evaluated based on the properties, and the evaluated conditions and operators may be used to determine if the classification rule is met. If the classification rule is met, a device class of the electronic device is obtained from the outcome. Otherwise, if none of the classification rules are met, the device class may be identified as a default device class. In other words, the classification rules may be decoupled from the operation of the content provider, allowing the classification of the electronic device to be dynamically modified without requiring changes to the content provider.

The device class may then be provided to the content provider to allow the content provider to select content to transmit to the electronic device based on the device class. For example, the device class may correspond to a group of electronic devices with Ajax support and touchscreens. As a result, the content provider may send Ajax-enabled content and/or content configured for use with touchscreens to the electronic device. On the other hand, the device class may correspond to the default (e.g., unrecognized) device class. Instead of adapting the content to the electronic device, the content provider may transmit default content that is not adapted to a specific device class to the electronic device.

FIG. 1 shows the distribution of content from a content provider 110 to a set of electronic devices 102-108 in accordance with the disclosed embodiments. Content provider 110 may correspond to a web server, file server, software update server, and/or other computer system that provides content to electronic devices 102-108. Electronic devices 102-108 may correspond to personal computers, laptop computers, tablet computers, e-book readers, mobile phones, personal digital assistants (PDAs), portable media players, and/or other electronic devices that include functionality to interact with content provider 110.

Electronic devices 102-108 may communicate with content provider 110 over a network 112 such as a local area network (LAN), wide area network (WAN), wireless network, mobile phone network, intranet, and/or Internet. To interact with content provider 110, each electronic device 102-108 may send a request for content over network 112 to content provider 110. For example, electronic devices 102-108 may transmit HTTP requests for webpages, images, video, audio, documents, and/or other content to content provider 110. Content provider 110 may process the requests by generating and/or retrieving the requested content and transmitting the content over network 112 to electronic devices 102-108.

Content provider 110 may also adapt the content to each electronic device's features and/or capabilities. For example, content provider 110 may obtain an identifier for the electronic device from the electronic device's request. Content provider 110 may use the identifier to retrieve a device profile containing a set of properties for the electronic device from a device description repository containing device profiles for a variety of electronic devices (e.g., electronic devices 102-108). Content provider 110 may then tailor the content to the electronic device's properties to facilitate use of the content by a user of the electronic device.

Those skilled in the art will appreciate that content adaptation may be tightly coupled to an electronic device's identity and/or properties. For example, content adaptation code executing on content provider 110 may be written to identify specific device classes of electronic devices 102-108 and transform content to adapt to the device classes. Such tight coupling may require extensive changes to the content adaptation code to accommodate additions and/or modifications to the device classes. For example, the content adaptation code may be rewritten every time a new device class is added and/or the properties associated with an existing device class are changed. Continuing increases in the number and/or complexity of device classes over time may result in a corresponding increase in the development time and/or complexity of the content adaptation code.

Moreover, mechanisms for identifying and/or classifying electronic devices 102-108 for content provider 110 may be tailored to the content served by content provider 110. Consequently, the same mechanisms may not be suitable for use with other types of content. For example, content provider 110 may be configured to identify and classify electronic devices 102-108 based on the properties of electronic devices 102-108 that are relevant to the serving of web content from content provider 110. As a result, content provider 110 may be unable to identify and classify electronic devices 102-108 for the delivery of application installation packages and/or software patches to electronic devices 102-108.

In one or more embodiments, the content adaptation functionality of content provider 110 is facilitated by decoupling the identification and/or classification of electronic devices 102-108 from the generation and/or transformation of content sent to electronic devices 102-108. As discussed below, a set of classification rules associated with content provider 110 may be used to identify a device class of an electronic device (e.g., electronic devices 102-108) interacting with content provider 110. The classification rules may be decoupled from the execution of content provider 110, thus enabling changes to the classification of electronic devices 102-108 without requiring changes to and/or interrupting the execution of content provider 110. The device class may then be provided to content provider 110 to enable the transmission of content based on the device class from content provider 110 to the electronic device.

Figure 2:
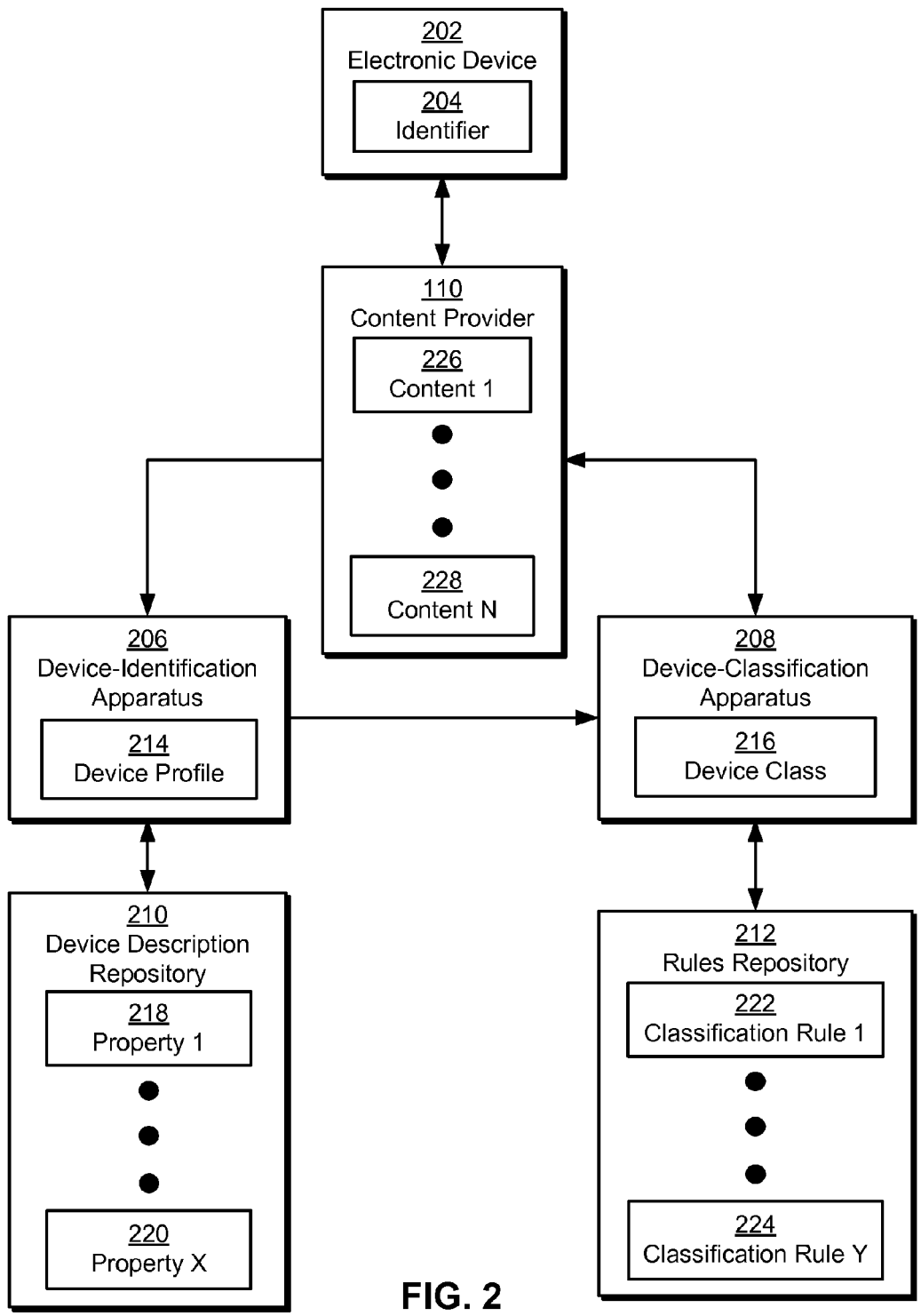
FIG. 2 shows a schematic of a system in accordance with the disclosed embodiments.

FIG. 2 shows a schematic of a system in accordance with the disclosed embodiments. As mentioned above, the system of FIG. 2 may facilitate the adaptation of content (e.g., content 1 226, content n 228) from content provider 110 to an electronic device 202. For example, content provider 110 may correspond to a server that serves application content (e.g., application installation packages, software updates, etc.), web content (e.g., webpages, scripts, etc.), and/or data (e.g., images, video, audio, files, documents) to electronic device 202 based on the capabilities and/or characteristics of electronic device 202.

As shown in FIG. 2, the system includes a device-identification apparatus 206 and a device-classification apparatus 208. Device-identification apparatus 206 may obtain a device profile 214 for electronic device 202 based on an identifier 204 for electronic device 202. Identifier 204 may be provided in a request for content from electronic device 202 to content provider 110. For example, electronic device 202 may transmit an HTTP request for a webpage, image, and/or document to content provider 110. The HTTP request may include a "User-Agent" header field that contains identifier 204. Electronic device 202 may obtain identifier 204 from the request and provide identifier 204 to device-identification apparatus 206. Alternatively, electronic device 202 may provide the complete request to device-identification apparatus 206, and device-identification apparatus 206 may extract identifier 204 from the request.

After device-identification apparatus 206 obtains identifier 204, device-identification apparatus 206 may use identifier 204 to obtain device profile 214 from a device description repository 210 such as Wireless Universal Resource File (WURFL) and/or DeviceAtlas (DeviceAtlas™ is a registered trademark of mTLD Top Level Domain Ltd.). For example, device-identification apparatus 206 may provide identifier 204 as a key to device description repository 210 and retrieve device profile 214 as a set of properties (e.g., property 1 218, property x 220) for electronic device 202 from device description repository 210.

Moreover, device-identification apparatus 206 may have access to more than one device description repository. For example, device-identification apparatus 206 may include functionality to retrieve properties for electronic device 202 from both WURFL and DeviceAtlas. By creating device profile 214 using data from multiple device description repositories, device-identification apparatus 206 may increase the comprehensiveness and/or level of detail in device profile 214. For example, device-identification apparatus 206 may consolidate properties matching identifier 204 from two different device description repositories into a single device profile 214 for electronic device 202. In addition, if one of the device description repositories lacks information about electronic device 202, device-identification apparatus 206 may obtain device profile 214 from a different device description repository instead of failing to find a set of properties that matches identifier 204.

Next, device-classification apparatus 208 may obtain device profile 214 from device-identification apparatus 206 and a set of classification rules (e.g., classification rule 1 222, classification rule y 224) associated with content provider 110 from a rules repository 212. The classification rules may specify a number of device classes and a set of properties associated with each device class. For example, the classification rules may classify electronic device 202 and/or other electronic devices based on an input device, a display dimension, a display resolution, an operating system, a hardware capability, and/or a software capability associated with each electronic device.

Device-classification apparatus 208 may then identify a device class 216 of electronic device 202 based on device profile 214 and the classification rules. For example, device-classification apparatus 208 may evaluate a set of conditions in each classification rule using the properties in device profile 214 and/or one or more operators in the classification rule to determine if the classification rule is met by device profile 214. If the classification rule is met, device-classification apparatus 208 may obtain device class 216 from an outcome of the classification rule. If none of the classification rules are met, device-classification apparatus 208 may identify device class 216 as a default device class. Identification of device classes based on device profiles and classification rules is discussed in further detail below with respect to FIG. 3.

Finally, device-classification apparatus 208 may provide device class 216 to content provider 110, and content provider 110 may select content (e.g., content 1 226, content n 228) to transmit to electronic device 202 based on device class 216. In particular, content provider 110 may generate, modify, and/or retrieve the content based on the properties associated with device class 216 and transmit the content to electronic device 202.

For example, device class 216 may be related to the platform, operating system, and/or execution environment of electronic device 202. Content provider 110 may thus use device class 216 to select application installation packages and/or software patches that are compatible with electronic device 202. Alternatively, device class 216 may be related to the input devices (e.g., touchscreen, keyboard, keypad), displays (e.g., size, resolution), hardware capabilities (e.g., global positioning system (GPS) receivers, wireless transceivers, processors, memory, near field communication (NFC)), and/or software capabilities (e.g., installed applications, scripting support, security) of electronic device 202. As a result, content provider 110 may use device class 216 to generate and/or format webpages, images, video, documents, and/or files for use with the input/output (I/O) devices, hardware, and/or software of electronic device 202. Finally, if device class 216 corresponds to a default (e.g., unrecognized) device class, content provider 110 may transmit default content to electronic device 202.

Because the classification rules are stored in rules repository 212 and decoupled from the execution of content provider 110, the classification rules may be created and/or modified without requiring changes to the execution of content provider 110. For example, content provider 110 may generate the classification rules and populate rules repository 212 with the classification rules to allow device-classification apparatus 208 to identify device classes of electronic devices interacting with content provider 110. Content provider 110 may subsequently update the classification rules to add new device classes and/or change existing device classes without modifying the operation of device-identification apparatus 206 and/or device-classification apparatus 208. In other words, the execution of device-identification apparatus 206 and/or device-classification apparatus 208 may be unaffected by the introduction of device profiles for new electronic devices to device description repository 210, changes to the criteria used to classify the devices in the classification rules, and/or changes to the types of content provided by content provider 110.

Device-identification apparatus 206 and/or device-classification apparatus 208 may additionally enable the dynamic creation of device classes for use by content provider 110 in generating and/or transforming content. For example, a clustering technique may be used to identify groups of similar electronic devices based on properties that are relevant to the content served by content provider 110. The groups may be used to create classification rules that place the electronic devices into device classes corresponding to the groups. The classification rules may then be provided to content provider 110 to allow content provider 110 to tailor the content to the properties of each group. Finally, the clustering technique may be used to place electronic devices with new properties into existing device classes (e.g., groups) and/or generate new device classes from the new properties.

Those skilled in the art will appreciate that the system of FIG. 2 may be implemented in a variety of ways. First, device-identification apparatus 206 and device-classification apparatus 208 may be implemented by the same hardware and/or software component, or device-identification apparatus 206 and device-classification apparatus 208 may execute independently from one another. Similarly, device-identification apparatus 206 and/or device-classification apparatus may execute locally on electronic device 202 and/or remotely on a cloud-computing system. Finally, device description repository 210 and/or rules repository 212 may be provided by a number of data-storage mechanisms, including relational databases, Extensible Markup Language (XML) documents, and/or text files.

Figure 3:
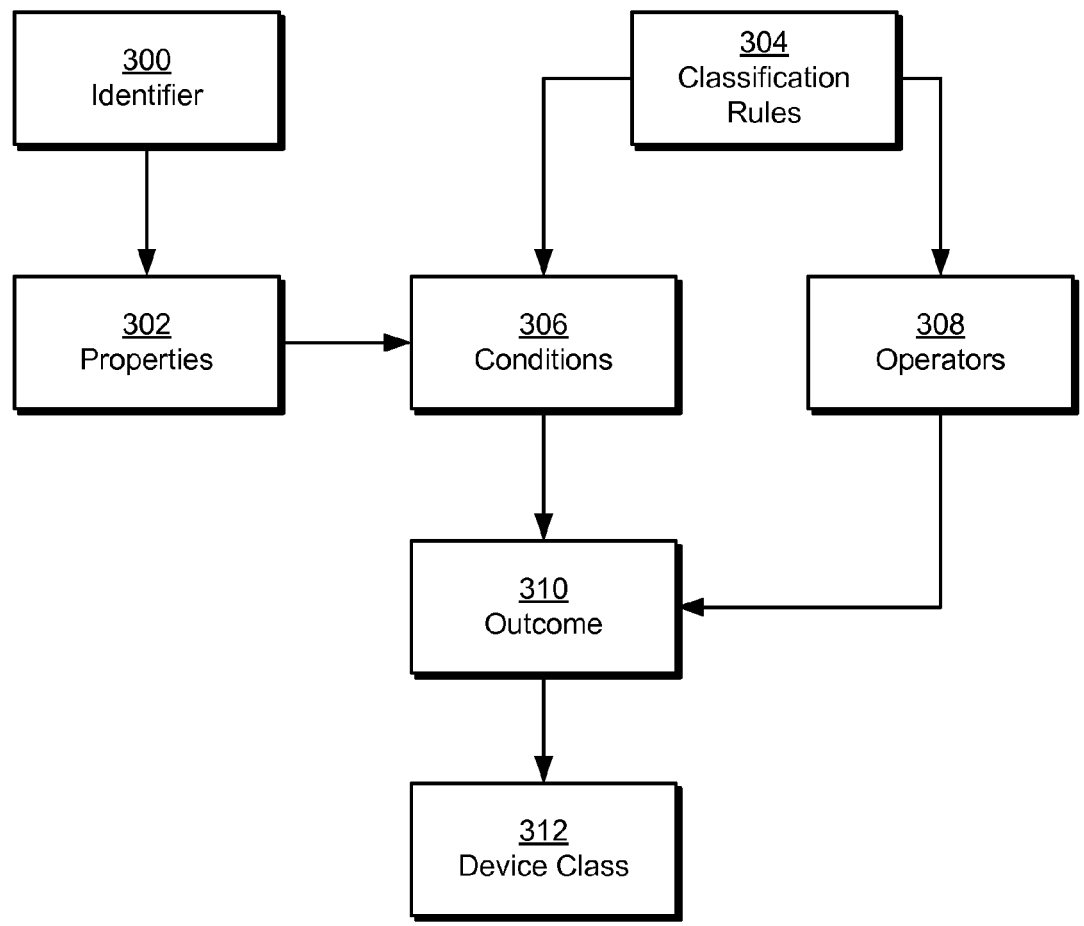
FIG. 3 shows the identification of a device class of an electronic device in accordance with the disclosed embodiments.

FIG. 3 shows the identification of a device class 312 of an electronic device in accordance with the disclosed embodiments. The identification of device class 312 may begin by obtaining an identifier 300 for the electronic device. For example, identifier 300 may be obtained from a "User-Agent" field of an HTTP request from the electronic device to a content provider (e.g., content provider 110 of FIG. 1).

Next, identifier 300 may be used to obtain a device profile containing a set of properties 302 for the electronic device. For example, identifier 300 may be provided as a key to one or more device description repositories (e.g., device description repository 210 of FIG. 2), and a set of properties 302 matching the key may be retrieved from the device description repositories as the device profile. Properties 302 may include an input device, a display dimension, a display resolution, an operating system, a hardware capability, and/or a software capability of the electronic device.

Properties 302 may then be used to evaluate a set of classification rules 304 associated with the content provider. Classification rules 304 may be provided by the content provider and/or generated using a clustering technique. In addition, each classification rule may include a set of conditions 306, one or more operators 308, and an outcome 310. To evaluate the classification rule, conditions 306 may be evaluated based on properties 302, and the evaluated conditions 306 and operators 308 may be used to determine if the classification rule is met by properties 302. If the classification rule is met, device class 312 is obtained from outcome 310. If none of the classification rules are met by properties 302, device class 312 may be identified as a default device class.

In particular, classification rules 304 may be specified using the following exemplary XML elements:

```
<DeviceClassificationRules>
    <Rule id ="1">
        <Conditions operatortype="AND" id="root">
            <Condition>
                <PropertyName>inputdevices</PropertyName>
                <PropertyValue>
                    <AbsoluteValue>touchscreen</AbsoluteValue>
                </PropertyValue>
            </Condition>
            <Conditions operatortype="OR" id="root_sub_condition1">
                <Condition>
                    <PropertyName>markup</PropertyName>
                    <PropertyValue>
                        <AbsoluteValue>html4</AbsoluteValue>
                    </PropertyValue>
                </Condition>
                <Condition>
                    <PropertyName>markup</PropertyName>
                    <PropertyValue>
                        <AbsoluteValue>html_web_4_0</AbsoluteValue>
                    </PropertyValue>
                </Condition>
            </Conditions>
            <Condition>
                <PropertyName>displaywidth</PropertyName>
                <PropertyValue>
                    <Range>
                        <Min>240</Min>
                        <Max></Max>
                    </Range>
                </PropertyValue>
            </Condition>
            <Conditions operatortype="AND" id="ajax">
                <Condition>
                    <PropertyName>JAVASCRIPT</PropertyName>
                    <PropertyValue>
                        <AbsoluteValue>true</AbsoluteValue>
                    </PropertyValue>
```

```
                    </Condition>
                    <Condition>
                        <PropertyName>JSXHR</PropertyName>
                        <PropertyValue>
                            <AbsoluteValue>standard</AbsoluteValue>
                        </PropertyValue>
                    </Condition>
                    <Condition>
                        <PropertyName>JSDOM</PropertyName>
                        <PropertyValue>
                            <AbsoluteValue>true</AbsoluteValue>
                        </PropertyValue>
                    </Condition>
                    <Condition>
                        <PropertyName>JSEVENTS</PropertyName>
                        <PropertyValue>
                            <AbsoluteValue>true</AbsoluteValue>
                        </PropertyValue>
                    </Condition>
                    <Condition>
                        <PropertyName>JSEVENTLISTENER</PropertyName>
                        <PropertyValue>
                            <AbsoluteValue>true</AbsoluteValue>
                        </PropertyValue>
                    </Condition>
                    <Condition>
                        <PropertyName>JSGETELEMENTBYID</PropertyName>
                        <PropertyValue>
                            <AbsoluteValue>true</AbsoluteValue>
                        </PropertyValue>
                    </Condition>
                    <Condition>
                        <PropertyName>JSINNERHTML</PropertyName>
                        <PropertyValue>
                            <AbsoluteValue>true</AbsoluteValue>
                        </PropertyValue>
                    </Condition>
                </Conditions>
            </Conditions>
            <Outcome>
                <DeviceClass name="class1"></DeviceClass>
            </Outcome>
        </Rule>
        <Rule id ="2">
            <Conditions operatortype="OR" id="root_rule2">
                <Condition>
                    <PropertyName>browser</PropertyName>
                    <PropertyValue>
                        <PartialValue>blackberry</PartialValue>
                    </PropertyValue>
                </Condition>
                <Conditions operatortype="AND" id="rule2_sub2">
                    <Condition>
                        <PropertyName>displaywidth</PropertyName>
                        <PropertyValue>
                            <Range>
                                <Min>176</Min>
                                <Max></Max>
                            </Range>
                        </PropertyValue>
                    </Condition>
                    <Condition>
                        <PropertyName>qwertykeyboard</PropertyName>
                        <PropertyValue>
                            <AbsoluteValue>true</AbsoluteValue>
                        </PropertyValue>
                    </Condition>
                </Conditions>
            </Conditions>
            <Outcome>
                <DeviceClass name="class2"></DeviceClass>
            </Outcome>
        </Rule>
        <DefaultOutcome>
            <DeviceClass name="generic"></DeviceClass>
        </DefaultOutcome>
</DeviceClassificationRules>
```

The XML elements may be described and/or defined using an XML schema for classification rules 304. Consequently, both the semantics and content of classification rules 304 may be readily tailored for the classification of electronic devices in a variety of content adaptation contexts. For example, new semantics may be added to classification rules 304 by modifying the XML schema, and new classification rules may be added to classification rules 304 by modifying the XML document containing classification rules 304.

Within the XML elements, two classification rules are specified using the "Rule" element. Each classification rule includes a number of conditions (e.g., conditions 306) specified using the "Condition" element, as well as logical operators (e.g., operators 308) to be applied to the conditions specified using the "Conditions" element. Each condition may include the name of a property (e.g., "PropertyName") associated with the electronic device, a value for the property (e.g., "PropertyValue"), and/or an attribute associated with the value (e.g., "Min," "Max," "AbsoluteValue"). Each classification rule also includes an outcome (e.g., outcome 310) specified using the "Outcome" element.

To determine device class 312 from the XML elements and properties (e.g., properties 302) of the electronic device, the conditions may be evaluated based on the properties, and the evaluated conditions and the operators may be used to determine if the classification rule is met. For example, the second classification rule (e.g., "<Rule id="2">") may be met if the "browser" property of the electronic device includes the term "blackberry" and/or if the "displaywidth" property of the electronic device has a minimum value of 176 and the "qwertykeyboard" property of the electronic device has a value of "true." If the second classification rule is met, device class 312 is identified as "class2" from the "Outcome" element of the second classification rule. On the other hand, if neither of the classification rules is met, device class 312 is identified as "generic" from a "DefaultOutcome" element at the end of the XML elements.

Figure 4:
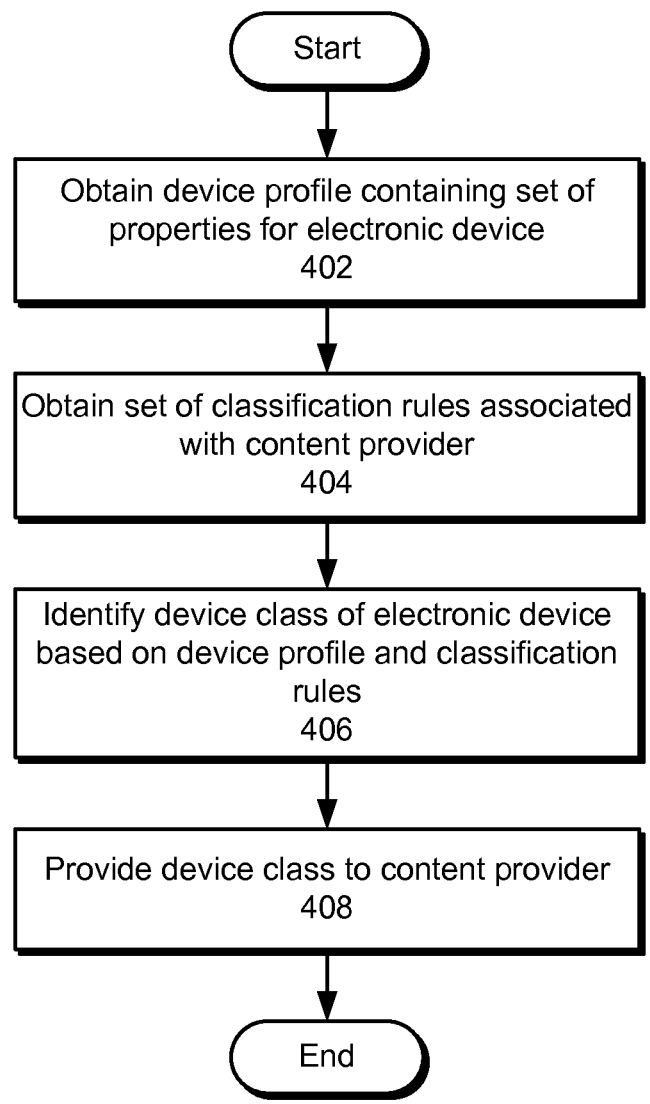
FIG. 4 shows a flowchart illustrating the process of facilitating interaction between an electronic device and a content provider in accordance with the disclosed embodiments.

FIG. 4 shows a flowchart illustrating the process of facilitating interaction between an electronic device and a content provider in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

Initially, a device profile containing a set of properties for the electronic device is obtained (operation 402). The properties may include an input device, a display dimension, a display resolution, an operating system, a hardware capability, and/or a software capability. To obtain the device profile, an identifier for the electronic device may be obtained. For example, the identifier may be obtained from a request for content by the portable electronic device and/or the content provider. The identifier may then be used to obtain the device profile from a device description repository (e.g., device description repository 210 of FIG. 1).

Next, a set of classification rules associated with the content provider is obtained (operation 404). The classification rules may be decoupled from the execution of the content provider. For example, the classification rules may be generated by the content provider and/or a clustering technique. The classification rules may then be stored in a rules repository (e.g., rules repository 212 of FIG. 1) and retrieved from the rules repository to perform dynamic classification of the electronic device independently from the execution of the content provider.

In particular, a device class of the electronic device is identified based on the device profile and classification rules (operation 406). Identification of the electronic device's device class is discussed in further detail below with respect to FIG. 5. Finally, the device class is provided to the content provider (operation 408) so that the content provider may select content to transmit to the electronic device based on the device class. For example, the device class may allow the content provider to provide web content, application content, and/or data that is appropriate for the electronic device to the electronic device.

Figure 5:
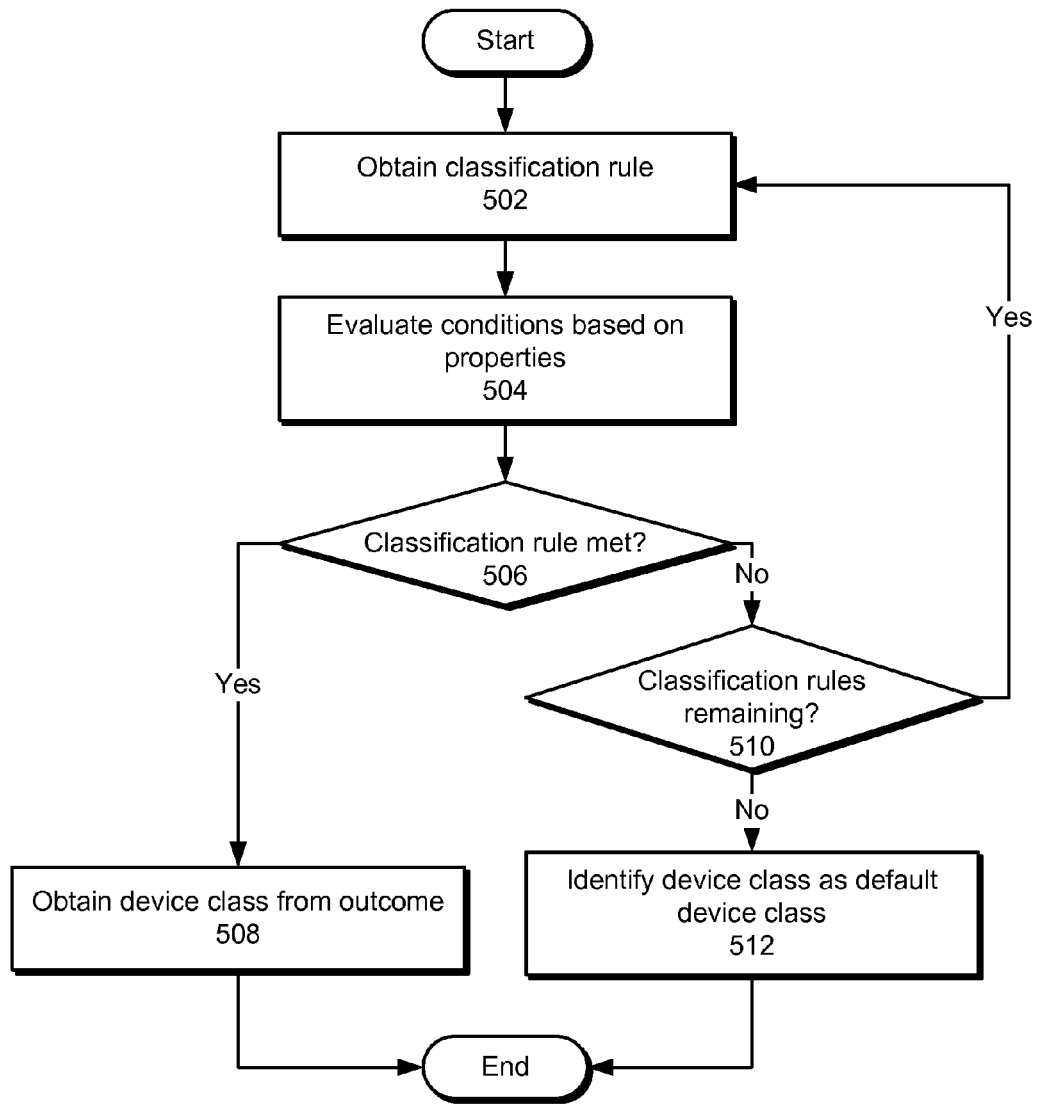
FIG. 5 shows a flowchart illustrating the process of identifying a device class of an electronic device in accordance with the disclosed embodiments.

FIG. 5 shows a flowchart illustrating the process of identifying a device class of an electronic device in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

First, a classification rule is obtained (operation 502). The classification rule may be associated with a content provider and include a set of conditions, one or more operators, and an outcome. Next, the conditions are evaluated based on the properties of the electronic device (operation 504), and the evaluated conditions and operators are used to determine if the classification rule is met (operation 506). For example, the property name, value, and/or attribute of each condition may be compared to the properties of the electronic device to determine if one of the electronic device's properties meets the condition. A set of logical operators may then be used to compare the evaluated conditions and return a value of "true" or "false" for the condition, with "true" indicating that the classification rule is met and "false" indicating that the classification rule is not met.

If the classification rule is met, the device class is obtained from the outcome (operation 508) of the classification rule. For example, the name of the device class may be obtained from an XML element corresponding to the classification rule's outcome.

If the classification rule is not met, identification of the electronic device's device class may proceed with remaining classification rules (operation 510) associated with the content provider. If classification rules remain to be evaluated, a new classification rule is obtained (operation 502), and the classification rule's conditions are evaluated based on the electronic device's properties (operation 504). Operators from the classification rule may then be applied to determine if the classification rule is met (operation 506) by the evaluated conditions. If the classification rule is met, the device class is obtained from the classification rule's outcome (operation 508). On the other hand, if the classification rule is not met and all remaining classification rules have been evaluated, the device class is identified as a default device class (operation 512).

Figure 6:
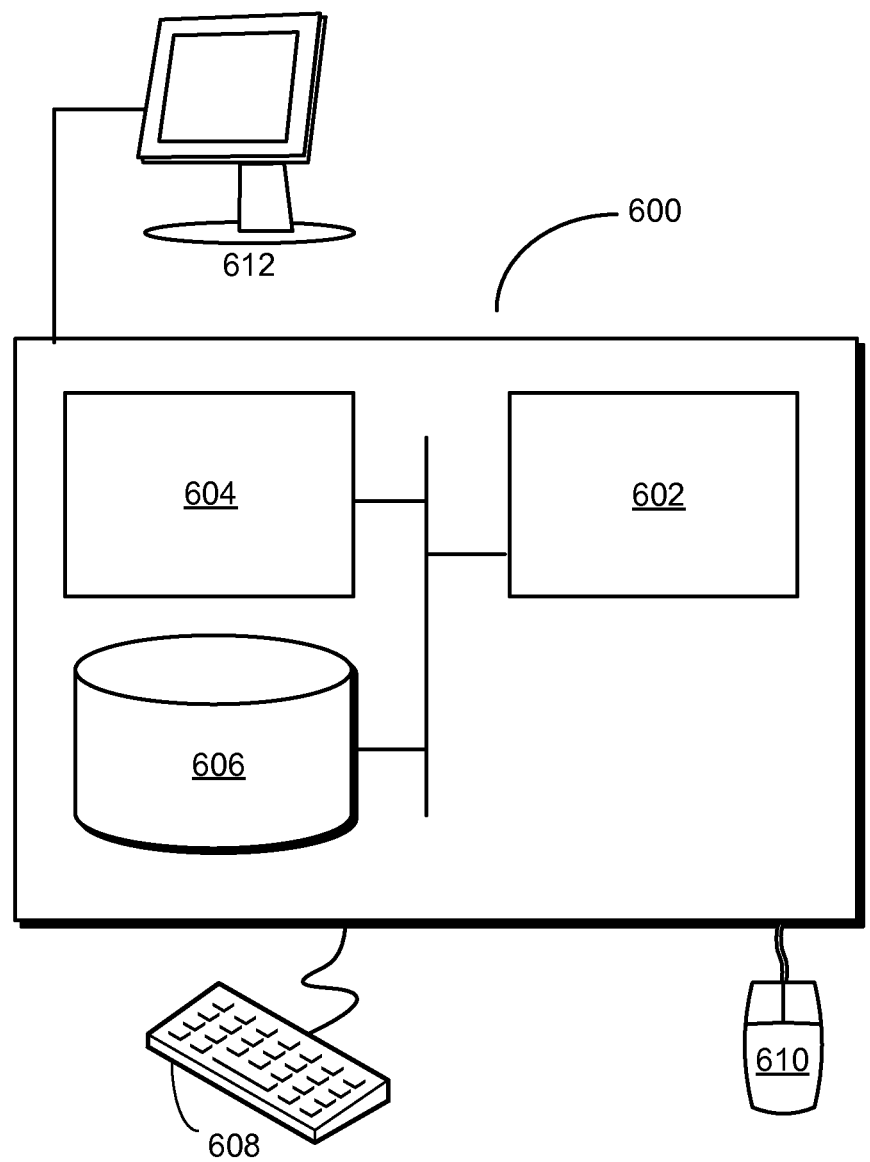
FIG. 6 shows a computer system in accordance with the disclosed embodiments.

FIG. 6 shows a computer system 600 in accordance with an embodiment. Computer system 600 may correspond to an apparatus that includes a processor 602, memory 604, storage 606, and/or other components found in electronic computer systems. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In particular, computer system 600 may provide a system for facilitating interaction between an electronic device and a content provider. The system may include a device-identification apparatus that receives an identifier for the electronic device from the content provider and uses the identifier to obtain a device profile containing a set of properties for the electronic device from a device description repository. The system may also include a device-classification apparatus that obtains a set of classification rules associated with the content provider from a rules repository. The device-classification apparatus may also identify a device class of the electronic device based on the device profile and the classification rules. Finally, the device-classification apparatus may provide the device class to the content provider to allow the content provider to select content to transmit to the electronic device based on the device class.

In addition, one or more components of computer system 600 may be remotely located and connected to the other components over a network. Portions of the present embodiments (e.g., device-identification apparatus, device-classification apparatus, device description repository, rules repository, etc.) may also be located on different nodes of a distributed system that implements the embodiments. For example, the present embodiments may be implemented using a cloud-computing system that dynamically classifies electronic devices for a number of content providers using classification rules associated with each of the content providers.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating interaction between an electronic device and a content provider, comprising:
    receiving, from the content provider, a set of device classification rules that identify a set of device classes;
    populating a rules repository with the received set of device classification rules, wherein the rules repository is separate from the content provider;
    updating, by the content provider, the device classification rules in the rules repository, wherein the updating involves:
    modifying one or more device classes in the set of device classes; and
    adding one or more new device classes to the set of device classes;
    dynamically creating new device classes by identifying groups of similar devices based on properties relevant to the content served by the content provider using a clustering technique;
    obtaining a device profile comprising a set of properties for the electronic device;
    identifying, from the set of device classes, a device class of the electronic device based on the device profile and the device classification rules in the rules repository, wherein the identifying involves:
        evaluating conditions based on properties associated with the device classification rules;
        determining that at least one of the device classification rules are met, obtaining the device class from an outcome associated with the classification rule; and
        in response to determining that none of the device classification rules are met, identifying the device class as a default device class; and
    providing the identified device class to the content provider, wherein the content provider selects content to transmit to the electronic device based on the identified device class.

2. The computer-implemented method of claim 1, wherein obtaining the device profile involves:
    obtaining an identifier for the electronic device; and
    using the identifier to obtain the device profile from a device description repository.

3. The computer-implemented method of claim 2, wherein the identifier is obtained from at least one of a request for the content by the electronic device and the content provider.

4. The computer-implemented method of claim 1, wherein each classification rule from the set of classification rules comprises:
    a set of conditions;
    one or more operators; and
    an outcome.

5. The computer-implemented method of claim 1, wherein the set of properties comprises at least one of an input device, a display dimension, a display resolution, an operating system, a hardware capability, and a software capability.

6. The computer-implemented method of claim 1, wherein the content is at least one of web content, application content, and data.

7. A non-transitory computer-readable storage medium storing instructions that when executed by a computer cause the computer to perform a method for facilitating interaction between an electronic device and a content provider, the method comprising:
    receiving, from the content provider, a set of device classification rules that identify a set of device classes;
    populating rules repository with the received set of device classification rules, wherein the rules repository is separate from the content provider;
    updating, by the content provider, the device classification rules in the rules repository, wherein the updating involves:
    modifying one or more device classes in the set of device classes; and
    adding one or more new device classes to the set of device classes;
    dynamically creating new device classes by identifying groups of similar devices based on properties relevant to the content served by the content provider using a clustering technique;
    obtaining a device profile comprising a set of properties for the electronic device;
    identifying, from the set of device classes, a device class of the electronic device based on the device profile and the device classification rules in the rules repository, wherein the identifying involves:
        evaluating conditions based on properties associated with the device classification rules;
        determining that at least one of the device classification rule are met, obtaining the device class from an outcome associated with the classification rule; and in response to determining that none of the device classification rules are met, identifying the device class as a default device class; and providing the identified device class to the content provider, wherein the content provider selects content to transmit to the electronic device based on the identified device class.

8. The computer-readable storage medium of claim 7, wherein obtaining the device profile involves:

obtaining an identifier for the electronic device; and using the identifier to obtain the device profile from a device description repository.

9. The computer-readable storage medium of claim 7, wherein each classification rule from the set of classification rules comprises:

a set of conditions;

one or more operators; and an outcome.

10. The computer-readable storage medium of claim 7, wherein the set of properties comprises at least one of an input device, a display dimension, a display resolution, an operating system, a hardware capability, and a software capability.

11. The computer-readable storage medium of claim 7, wherein the content is at least one of web content, application content, and data.

12. A system for facilitating interaction between an electronic device and a content provider, comprising:

a device-identification apparatus configured to:

receive an identifier for the electronic device from the content provider; and use the identifier to obtain a device profile comprising a set of properties for the electronic device; and a device-classification apparatus configured to:

receive, from the content provider, a set of device classification rules that identify a set of device classes;

populate a rules repository with the received set of device classification rules, wherein the rules repository is separate from the content provider;

update, by the content provider, the device classification rules in the rules repository, wherein the updating involves:

modifying one or more device classes in the set of device classes; and adding one or more new device classes to the set of device classes;

dynamically create new device classes by identifying groups of similar devices based on properties relevant to the content served by the content provider using a clustering technique;

identify, from the set of device classes, a device class of the electronic device based on the device profile and the device classification rules in the rules repository, wherein the identifying involves:

evaluating conditions based on properties associated with the device classification rules;

determining that at least one of the device classification rule are met, obtaining the device class from an outcome associated with the classification rule; and in response to determining that none of the device classification rules are met, identifying the device class as a default device class; and providing the identified device class to the content provider, wherein the content provider selects content to transmit to the electronic device based on the identified device class.

13. The system of claim 12, wherein the device-identification apparatus obtains the device profile from a device description repository.

14. The system of claim 12, wherein the device-classification apparatus obtains the set of classification rules from a rules repository.

15. The system of claim 12, wherein each classification rule from the set of classification rules comprises:

a set of conditions;

one or more operators; and an outcome.

16. The system of claim 12, wherein the set of properties comprises at least one of an input device, a display dimension, a display resolution, an operating system, a hardware capability, and a software capability.

17. The system of claim 12, wherein the content is at least one of web content, application content, and data.

* * * * *